Figure 1:
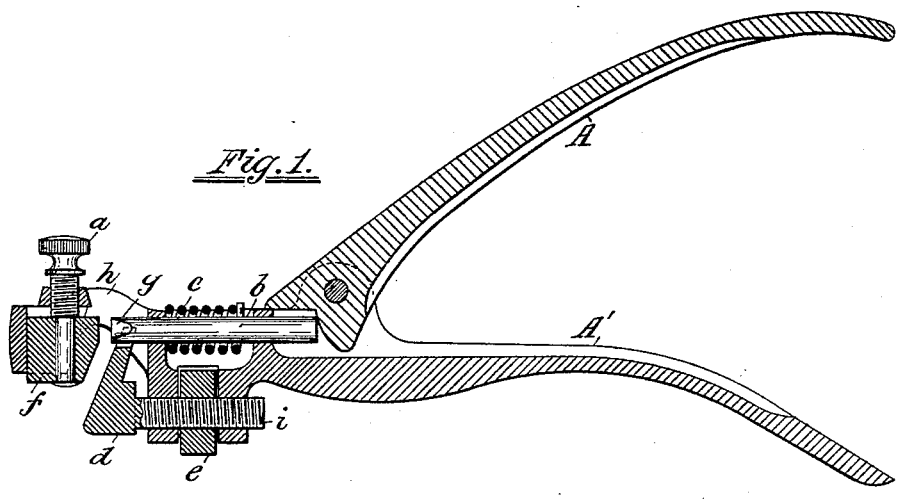

No. 616,406. Patented Dec. 20, 1898.
H. COTTRELL.
SAW SET.
(Application filed Feb. 5, 1898.)

(No Model.)

Witnesses
H. C. Condit
L. M. Orr

Inventor
Herbert Cottrell

THE NORRIS PETERS CO., PHOTO-LITHO., WASHINGTON, D. C.

UNITED STATES PATENT OFFICE.

HERBERT COTTRELL, OF NEWARK, NEW JERSEY, ASSIGNOR TO L. A. SAYRE & CO., OF SAME PLACE.

SAW-SET.

SPECIFICATION forming part of Letters Patent No. 616,406, dated December 20, 1898.

Application filed February 5, 1898. Serial No. 669,184. (No model.)

*To all whom it may concern:*

Be it known that I, HERBERT COTTRELL, of the city of Newark, county of Essex, State of New Jersey, have invented certain new and useful Improvements in Saw-Sets, of which the following is a specification.

My invention relates to novel improvements in that class of saw-sets having a vertically-adjustable anvil, a longitudinally-movable punch, and an adjusting device for guiding the saw relatively to the anvil preparatory to having its teeth set. Heretofore the adjustment of the anvil has been accomplished by means of a set-screw adapted to move in a slot, in which case the parts were liable to become separated and lost. A screw, threaded on its central portion and held in two bearings with the anvil adapted to act as a movable nut upon the threaded portion thereof, has also been used for such adjustment; but such construction is expensive, being difficult both to aline and to fit.

My invention obviates the foregoing objections, first, by constructing the anvil so as to move loosely upon the plain end of a screw and to be held in place thereon by riveting the end of the screw, the threaded portion of which is adapted to work in a correspondingly-threaded portion of the body of the saw-set, so as to adjust the anvil to the desired position. I thus simplify the construction and reduce the amount of labor and cost of manufacture.

My invention also consists in an adjusting device for guiding the saw relatively to the anvil preparatory to having its teeth set. Heretofore such adjustment has been attained by means of a slotted angle-plate held in place by a set-screw. In this case, also, the parts were liable to become separated and lost. A set-screw placed at an angle has also been used for this purpose; but while such device may press the saw to the proper angle relatively to the anvil it has no bearing-surface to guide the saw at right angles with the saw-set, thus lacking accuracy in the work performed.

To overcome the foregoing objections, I construct my adjusting device with a plate formed at a proper angle to the screw-threaded portion of the same, which screw is integral therewith, such plate being sufficiently wide to guide the saw at right angles to the body of the saw-set. This plate is also slotted to admit of the flattened end of the longitudinal punch passing through it, and when they are both in position they mutually act each to keep the other from turning. I provide two lugs upon the main body of the saw-set, which are drilled to receive the screw of the adjusting device and between which I apply a knurled nut adapted to turn upon the screw-thread, and thus adjust to the required position, providing therein a more perfect construction and mode of operation as well as insuring accuracy in its working.

Figure 2:
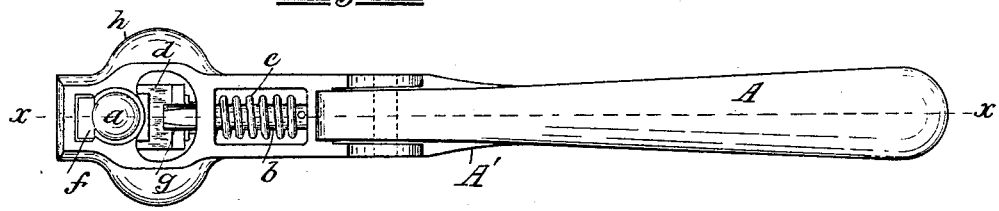

Figure 1 of the accompanying drawings represents a vertical section of a complete saw-set on the line X X, Fig. 2, in which is shown the main features of my invention. Fig. 2 is a plan view of the same, showing the general form thereof.

Similar letters refer to similar parts throughout the drawings, in which—

A represents the punch-lever, and A' the main body, which has two depending lugs upon the forward lower portion thereof, having holes drilled through them longitudinally, adapted to receive the screw *i* of the adjusting device. This screw *i* is formed with an angle-plate *d* upon the end thereof, the purpose of which is to guide the saw at a proper angle relatively to the anvil *f*, and it also has a knurled nut *e* fitted upon it between the depending lugs of the body A', adapted to move the adjusting device to the desired position. The angle-plate *d* is made broad enough to guide the saw and hold it at right angles to the main body A', and it is slotted at its extremity, so as to embrace the punch *b*, which is flattened to correspond to the slot, and they thus mutually act in this simple manner each to keep the other from turning out of their proper position.

The anvil *f* is fitted loosely upon the end of the screw *a*, which is turned plain, and it is held thereon by loosely riveting. It is caused to move adjustably in a recess provided in the body A' by means of the screw *a*, which is threaded through a suitable boss at the top of the recess.

In operation when the saw-blade rests upon the plate $d$, which, by means of the nut $e$, is set to the required thickness of the saw, and the anvil $f$ is adjusted to the teeth of the saw by means of the screw $a$, the lever A may be closed upon the body A', so as to move the punch $b$ and compress the retractile spring $c$, causing the beveled end $g$ of the punch $b$ to bend the tooth of the saw upon the anvil $f$. When the hold is released upon lever A, the retractile spring $c$ causes it to resume its former position, when the saw may be moved so as to bring the next tooth in position to be acted upon in the manner usual in the use of such implements.

Having thus described my invention and its mode of operation, what I claim as new, and desire to secure by Letters Patent, is—

1. In a saw-set having a longitudinally-operated punch, the combination therewith of a vertically-adjustable anvil, composed of the block $f$, drilled to receive the turned end of the screw $a$, and loosely held thereon by riveting, and fitted to a vertical recess in the end of the body A', of the saw-set, so as to be guided and supported by the walls thereof, and to be moved adjustably therein by the operation of the threaded portion of the screw $a$, in the tapped boss which forms the top of the recess, substantially as shown and set forth.

2. The combination with a saw-set having a vertically-adjustable anvil, and a longitudinally-operated punch; of the saw-adjusting device, composed of an angle-plate broad enough to give rectangular guidance to the saw, and slotted so as to embrace the end of the longitudinal punch; and having a screw-threaded extension integral therewith adapted to pass through holes in depending lugs upon the main body; the same to be adjusted by a nut upon the screw operating between the depending lugs, substantially, as shown, and for the purposes set forth.

In testimony that I claim the foregoing I have hereunto set my hand this 3d day of February, 1898.

HERBERT COTTRELL.

Witnesses:
    H. C. CONDIT,
    L. M. PIER.